(12) United States Patent
Yamauchi et al.

(10) Patent No.: US 8,465,836 B2
(45) Date of Patent: *Jun. 18, 2013

(54) METHOD FOR PRODUCING SINGLE-HOLE HOLLOW POLYMER PARTICLES

(75) Inventors: Hiroshi Yamauchi, Osaka (JP); Yasuyuki Yamada, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/254,927

(22) PCT Filed: Jul. 27, 2010

(86) PCT No.: PCT/JP2010/062603
§ 371 (c)(1),
(2), (4) Date: Oct. 18, 2011

(87) PCT Pub. No.: WO2012/014279
PCT Pub. Date: Feb. 2, 2012

(65) Prior Publication Data
US 2012/0189848 A1    Jul. 26, 2012

(51) Int. Cl.
*B32B 5/16*    (2006.01)

(52) U.S. Cl.
USPC ......... 428/403; 428/407; 427/212; 427/213.3

(58) Field of Classification Search
USPC ................ 428/402, 403, 407; 427/212, 213.3
See application file for complete search history.

(56) References Cited

U.S. PATENT DOCUMENTS

2006/0093822 A1    5/2006    Hsu et al.

FOREIGN PATENT DOCUMENTS

| EP | 0 695 769 | 2/1996 |
|---|---|---|
| JP | 62-127336 | 6/1987 |
| JP | 4-279637 | 10/1992 |
| JP | 4-68324 | 11/1992 |
| JP | 5-125127 | 5/1993 |
| JP | 05/125127 | * 5/1993 |
| JP | 2002-105104 | 4/2002 |
| JP | 2005/232426 | * 9/2005 |
| JP | 2010/100799 | * 5/2010 |
| WO | 2008/095256 | 8/2008 |
| WO | 2010/035680 | 4/2010 |
| WO | WO2010/035680 | * 4/2010 |

OTHER PUBLICATIONS

International Search Report issued Aug. 31, 2010 in International (PCT) Application No. PCT/JP2010/062603.
Front Page of International Publication WO2012/014279.
International Search Report issued Dec. 15, 2009 in International (PCT) Application No. PCT/JP2009/066241.
Supplementary European Search Report dated Feb. 16, 2012 in EP Application No. 09816095.5.

* cited by examiner

*Primary Examiner* — Leszek Kiliman
(74) *Attorney, Agent, or Firm* — Wenderoth, Lind & Ponack, L.L.P.

(57) ABSTRACT

Provided is a method for producing single-hole hollow polymer particles which have an extremely uniform outside diameter and inside diameter, and thus do not require a classifying operation. Further provided are single-hole hollow polymer particles produced by such a method for producing single-hole hollow polymer particles.
The invention relates to a method for producing single-hole hollow polymer particles, which includes: preparing a dispersion of swollen particle droplets by mixing a seed particle dispersion obtained by dispersing uncrosslinked polymer-containing seed particles in a water-containing dispersion medium, with a radical polymerizable monomer, an oil-soluble solvent and an oil-soluble polymerization initiator, and causing the radical polymerizable monomer, the oil-soluble solvent and the oil-soluble polymerization initiator to be absorbed in the seed particles; and polymerizing the radical polymerizable monomer in the swollen particle droplets. The relationship between the SP value of a polymer obtained by polymerizing the radical polymerizable monomer (SPp) and the SP value of the oil-soluble solvent (SPs) satisfies formula (1) below:

$$2.1 \leq SPp - SPs \leq 7.0 \qquad (1).$$

8 Claims, No Drawings

METHOD FOR PRODUCING SINGLE-HOLE HOLLOW POLYMER PARTICLES

This application is a U.S. national stage of International Application No. PCT/JP2010/062603 filed Jul. 27, 2010.

TECHNICAL FIELD

The present invention relates to a method for producing single-hole hollow polymer particles which have an extremely uniform outside diameter and inside diameter, and thus do not require a classifying operation. The invention further relates to single-hole hollow polymer particles produced by such a method for producing single-hole hollow polymer particles.

BACKGROUND ART

Methods for producing hollow polymer particles having a single hole include a method wherein polymer particles which have been obtained by uniformly dissolving a hydrophilic monomer, a crosslinkable monomer and an oil-soluble solvent together with a polymerization initiator so as to form a monomer solution, emulsifying and dispersing the monomer solution in an aqueous phase, and subsequent polymerization are then heated so as to volatilize the oil-soluble solvent. In this production method, a phase separation effect between the polymer to be formed and the oil-soluble solvent is employed to form a single hole in the particles.

However, in the hollow polymer particles having a single hole which are obtained by such a method, the particle size distribution depends on the method of mechanical manipulation in emulsification and dispersion. Regulating the outside diameter (particle diameter), inside diameter (single hole diameter), and the outside diameter to inside diameter ratio within fixed ranges has been difficult.

Even when a classifying operation is carried out with a sieve or mesh so as to achieve a uniform outside diameter, obtaining hollow polymer particles having a sufficiently uniform outside diameter distribution is difficult. Moreover, even were the outside diameter to be made uniform in this way, achieving a uniform inside diameter would be impossible.

In addition, methods of classifying the resulting hollow polymer particles by hydrodynamic processes involving the use of, for example, differences in specific gravity are known. However, because large outside diameter, large inside diameter (high degree of hollowness) particles and small outside diameter, small inside diameter (low degree of hollowness) particles end up having similar degrees of mobility, the classification of these particles by such a method has not been possible.

To address the above problems, hollow polymer particle production methods which involve having monomer ingredients absorbed by seed particles and inducing polymerization are being investigated. Using such methods, it is believed that hollow polymer particles having a relatively uniform outside diameter can be produced.

For example, Patent Document 1 discloses a method for producing polymer particles having a single inner hole. The production method described in Patent Document 1 includes the step of dispersing polymerizable monomer ingredients that include a crosslinkable monomer, a hydrophilic monomer and other monomers in an aqueous dispersion medium and in the presence of dissimilar polymer particles having a composition differing from that of the copolymer to be obtained using these polymerizable monomer ingredients, having the polymerizable monomer ingredients absorbed by the dissimilar polymer particles, then polymerizing the polymerizable monomer ingredients. In Patent Document 1, illustrative examples of the dissimilar polymer include polystyrenes and copolymers of styrene with at least one selected from among acrylic acid, methacrylic acid, acrylic esters, methacrylic esters and butadiene. Illustrative examples of the crosslinkable monomers include divinylbenzene, ethylene glycol dimethacrylate and trimethylolpropane triacrylate. Illustrative examples of the hydrophilic monomer include acrylic acid, methacrylic acid, methyl methacrylate, 2-hydroxyethyl methacrylate, vinylpyridine, glycidyl acrylate and glycidyl methacrylate. Other exemplary monomers include styrene. However, obtaining hollow polymer particles having an outside diameter and an inside diameter of sufficient uniformity by the method described in Patent Document 1 has been difficult. In the working examples of Patent Document 1 as well, although generally single-hole hollow polymer particles are obtained, neither the outside diameter nor the inside diameter were uniform. Moreover, in addition to particles having a single-hole structure, particles having a plurality of holes were also present.

Patent Document 2 discloses a method for producing hollow polymer particles having single inner holes with an average inner hole diameter from 0.25 to 0.85 time the average particle diameter of the particles by emulsion polymerizing (B) a monomer component which includes (B-a) an ionic monomer, (B-b) a nonionic monomer having a solubility parameter which decreases as the monomer changes to a polymer during polymerization and (B-c) a nonionic monomer other than the foregoing nonionic monomer (B-b). The emulsion polymerization is carried out in an aqueous medium, using a water-soluble polymerization initiator, at a polymerization temperature which satisfies certain conditions, and in the presence of (A) polymer particles obtained by polymerizing a monomer which includes (A-a) an ionic monomer, (A-b) a nonionic monomer having a solubility parameter which either does not change or increases as the monomer changes to a polymer during polymerization and (A-c) a nonionic monomer other than the foregoing nonionic monomer (A-b). Moreover, the production method described in Patent Document 2 is characterized in that, of the combination of above polymer particles (A) and monomer component (B), the absolute value of the difference between the solubility parameter [δ(A-b), p] of the polymer obtained by polymerizing the nonionic monomer serving as component (A-b) and the solubility parameter [δ(B-b), m] of the nonionic monomer serving as component (B-b) is 1.0 or less. However, in the method described in Patent Document 2, it was not possible to obtain hollow polymer particles having both outside diameters and inside diameters of sufficient uniformity. Moreover, in the production method described in Patent Document 2, because a water-soluble polymerization initiator is used, the content of polymerization initiator within the monomer oil droplets is small. As a result, not only does the conversion to the polymer decrease, emulsion polymerization also arises in the aqueous phase, which has resulted in the admixture of particles having no inner hole.

Patent Document 3 discloses a production method in which oil droplets are obtained by injecting a uniform mixture A containing a hydrophilic monomer, a crosslinkable monomer, another monomer and an oily substance through a microporous membrane into a liquid B which is immiscible in A, following which polymerization is carried out so as to obtain particles containing the oily substance as the nucleus. However, although the technique of passing the monomer through a microporous membrane does result in a more uniform outside diameter distribution than methods which use a conventional emulsifying apparatus, there does ultimately exist a need to carry out operations such as classification.

PRIOR ART DOCUMENTS

Patent Documents

Patent Document 1: Japanese Kokoku Publication Hei-04-068324 (JP-B 1104-068324)
Patent Document 2: Japanese Kokai Publication Hei-04-279637 (JP-A 1104-279637)
Patent Document 3: Japanese Kokai Publication 2002-105104 (JP-A 2002-105104)

SUMMARY OF THE INVENTION

Problems to be Solved by the Invention

An object of the present invention is to provide a method for producing single-hole hollow polymer particles which have an extremely uniform outside diameter and inside diameter, and thus do not require a classifying operation. A further object of the invention is to provide single-hole hollow polymer particles produced by such a method for producing single-hole hollow polymer particles.

Means for Solving the Problems

The invention provides a method for producing single-hole hollow polymer particles, which includes: preparing a dispersion of swollen particle droplets by mixing a seed particle dispersion obtained by dispersing uncrosslinked polymer-containing seed particles in a water-containing dispersion medium, with a radical polymerizable monomer, an oil-soluble solvent and an oil-soluble polymerization initiator, and causing the radical polymerizable monomer, the oil-soluble solvent and the oil-soluble polymerization initiator to be absorbed in the seed particles; and polymerizing the radical polymerizable monomer in the swollen particle droplets. The relationship between the SP value of a polymer obtained by polymerizing the radical polymerizable monomer (SPp) and the SP value of the oil-soluble solvent (SPs) satisfies formula (1) below:

$$2.15 \leq SPp - SPs \leq 7.0 \tag{1}$$

The invention is described in detail below.

The inventors have discovered that, in a method for producing polymer particles by causing a radical polymerizable monomer component to be absorbed in seed particles then inducing radical polymerization, when the difference between the SP value of the polymer obtained by polymerizing the radical polymerizable monomer and the SP value of the oil-soluble solvent used as the hole-forming agent is set so as to fall in a specific range, single-hole hollow polymer particles having an extremely uniform outside diameter and inside diameter can easily be produced, and have completed the present invention.

The method for producing single-hole hollow polymer particles of the invention includes the step of preparing a dispersion of swollen particle droplets by mixing a seed particle dispersion obtained by dispersing uncrosslinked polymer-containing seed particles in a water-containing dispersion medium, with a radical polymerizable monomer, an oil-soluble solvent and an oil-soluble polymerization initiator, and causing the radical polymerizable monomer, the oil-soluble solvent and the oil-soluble polymerization initiator to be absorbed in the seed particles. The method for producing single-hole hollow polymer particles of the invention may include also the step of preparing a seed particle dispersion by dispersing uncrosslinked polymer-containing seed particles in a water-containing dispersion medium.

The seed particles contain an uncrosslinked polymer.

Illustrative, non-limiting, examples of non-crosslinkable monomers making up the uncrosslinked polymer include styrene, methyl methacrylate, n-butyl methacrylate, isobutyl methacrylate, methacrylic acid, methyl acrylate, n-butyl acrylate, isobutyl acrylate and acrylic acid.

In cases where the above non-crosslinkable monomer is polymerized to form the above seed particles, a small amount of a crosslinkable monomer may be concomitantly used. Concomitantly using a small amount of a crosslinkable monomer improves the strength of the resulting seed particles.

Illustrative, non-limiting, examples of the crosslinkable monomer include divinylbenzene and ethylene glycol dimethacrylate.

When the above crosslinkable monomer is included, the preferred upper limit in the amount of crosslinkable monomer included relative to the combined amount of the non-crosslinkable monomer and the crosslinkable monomer is 5% by weight. At an amount of crosslinkable monomer in excess of 5% by weight, the absorption of the radical polymerizable monomer and the like in the resulting seed particles decreases, as a result of which swollen particle droplets may not be obtained. A more preferred upper limit in the amount of crosslinkable monomer included is 1% by weight.

The molecular weight of the seed particles is not subject to any particular limitation, although the preferred upper limit in the weight-average molecular weight is 500,000. At a weight-average molecular weight for the seed particles in excess of 500,000, the absorption of the radical polymerizable monomer and the like in the resulting seed particles decreases, as a result of which swollen particle droplets may not be obtained. A more preferred upper limit in the weight-average molecular weight of the seed particles is 100,000. No particular limitation is imposed on the lower limit in the weight-average molecular weight of the seed particles, although at less than 1,000 particle formation may be substantially impossible.

No particular limitation is imposed on the shape of the seed particles, although a spherical shape is preferred. In cases where the shape of the seed particles is not spherical, isotropic swelling does not take place during absorption of the radical polymerizable monomer, as a result of which the resulting single-hole hollow polymer particles may not become truly spherical.

The volume-average particle size of the seed particles is not subject to any particular limitation, although the preferred lower limit is 1/10 of the average outside diameter of the target single-hole hollow polymer particles, and the preferred upper limit is 1/1.05 of the average outside diameter of the target single-hole hollow polymer particles. When the volume-average particle size of the seed particles is less than 1/10 of the average outside diameter of the target single-hole hollow polymer particles, a large amount of radical polymerizable monomer, etc. in excess of the upper limit in absorption performance must be absorbed in order to obtain the desired single-hole hollow polymer particle outside diameter. As a result, incomplete absorption may occur or the outside diameter of the resulting single-hole hollow polymer particles may fail to become uniform. When the volume-average particle size of the seed particles exceeds 1/1.05 of the average outside diameter of the target single-hole hollow polymer particles, there is room for only a very small amount of radical polymerizable monomer, etc. to be absorbed, as a result of which it may not be possible to obtain single-hole hollow polymer particles having a high degree of hollowness. The volume-average particle size of the above seed particles is more preferably at least 1/8 and not greater than 1/1.5 of the average outside diameter of the target single-hole hollow polymer particles.

The preferred upper limit in the particle size coefficient of variation (Cv) for the seed particles is 30%. At a particle size Cv greater than 30% for the seed particles, the particle size of the swollen seed particles may not be uniform, and the particle size of the resulting single-hole hollow polymer particles may also not be uniform. The particle size Cv for the seed particles has a more preferred upper limit of 20%.

The particle size Cv of the seed particles can be calculated by formula (2) below from the volume-average particle size m measured with a particle size analyzer and the standard deviation σ.

$$Cv(\%) = \sigma/m \times 100 \qquad (2)$$

The average outside diameter of the single-hole hollow polymer particles can be determined by examination with a scanning electron microscope at a magnification that allows about 100 particles to be observed in a single field of view, measuring the maximum diameter for 50 randomly selected particles with a vernier caliper, and calculating the numerical average of the maximum diameters.

Illustrative, non-limiting, examples of the method of preparing the above seed particles include such methods as soap-free emulsion polymerization, emulsion polymerization and dispersion polymerization.

The dispersion medium is not subject to any particular limitation, provided it is a water-containing dispersion medium. Illustrative examples include water, and mixed dispersion media obtained by adding a water-soluble organic solvent such as methanol or ethanol to water.

The dispersion medium may also include an optional dispersant.

Illustrative, non-limiting, examples of the dispersant include alkyl sulfates/sulfonates, alkylbenzene sulfonates, triethanolamine alkyl sulfates, polyoxyethylene alkyl ethers and polyvinyl alcohols.

The amount of the seed particles included in the seed particle dispersion, although not subject to any particular limitation, has a preferred lower limit of 0.1% by weight and a preferred upper limit of 50% by weight. When the amount of seed particles included is less than 0.1% by weight, the production efficiency of the single-hole hollow polymer particles may become low. When the amount of seed particles included exceeds 50% by weight, the seed particles may end up agglomerating. The lower limit in the amount of seed particles included is more preferably 0.5% by weight, and the upper limit is more preferably 30% by weight.

In the method for producing single-hole hollow polymer particles of the invention, a dispersion of swollen particle droplets is prepared by mixing together the above-described seed particle dispersion, a radical polymerizable monomer, an oil-soluble solvent and an oil-soluble polymerization initiator, and causing the radical polymerizable monomer, oil-soluble solvent and oil-soluble polymerization initiator to be absorbed in the seed particles.

In the invention, it is important for the relationship between the SP value of the polymer obtained by polymerizing the radical polymerizable monomer (SPp) and the SP value of the oil-soluble solvent (SPs) to be selected so as to satisfy formula (1) above. At a SPp–SPs value below 2.1, phase separation of the obtained polymer and the oil-soluble solvent is difficult, as a result of which, in addition to single-hole hollow polymer particles, solid particles and multi-hole particles also end up forming at the same time. At a SPp–SPs value greater than 7.0, because the compatibility between the obtained polymer and the oil-soluble solvent is low, uniform swollen particle droplets do not form, as a result of which single-hole hollow polymer particles cannot form. The SPp–SPs value is preferably at least 2.4.

In this specification, "SP value" refers to a solubility parameter δ computed by formula (3) below using Okitsu's ΔF and Δv values for the various atomic groups listed in Table 1 below (from Toshinao Okitsu, Setchaku, Vol. 40, No. 8, p. 342-350 (Kobunshi Kankokai, 1996)). In the case of mixed solvents and copolymers, the SP value refers to a solubility parameter δ computed by formula (4) below.

$$\delta = \Sigma \Delta F / \Sigma \Delta v \qquad (3)$$

$$\delta_{mix} = \phi_1 \delta_1 + \phi_2 \delta_2 + \ldots \phi_n \delta_n \qquad (4)$$

In the formulas, ΔF represents the ΔF in Table 1 below, and Δv represents the molar volume Δv in Table 1 below. Also, φ represents the volume fraction or molar fraction, with $\phi_1 + \phi_2 + \ldots \phi_n = 1$.

TABLE 1

| Groups | Okitsu's ΔF | Δv | Groups | Okitsu's ΔF | Δv | Groups | Okitsu's ΔF | Δv |
|---|---|---|---|---|---|---|---|---|
| —CH$_3$ | 205 | 31.8 | —OH(Diol) | 270 | 12.0 | —SH | 310 | 28.0 |
| —CH$_2$— | 132 | 16.5 | —OH(Arom) | 238 | 12.0 | >SO$_2$ | 675 | 11.4 |
| >CH— | 28.6 | −1.0 | —NH$_2$ | 273 | 16.5 | >S=O | 485 | 11.4 |
| >CH— (Poly) | 28.6 | 1.9 | —NH$_2$(Arom) | 238 | 21.0 | —S— | 201 | 12.0 |
| >C< | −81 | 14.8 | —NH— | 180 | 8.5 | S= | 201 | 23.0 |
| >C<(Poly) | −81 | 19.2 | —NH— (Link) | 180 | 4.0 | SO$_3$ | 322 | 27.5 |
| CH$_2$= | 195 | 31.0 | —N< | 61.0 | −9.0 | SO$_4$ | 465 | 31.8 |
| —CH= | 116 | 13.7 | —N= | 118 | 5.0 | >Si< | 16.3 | 0 |
| >C= | 24.2 | −2.4 | —N= (Link) | 118 | 15.0 | PO$_4$ | 374 | 28.0 |
| =C= | 200 | 25.0 | —CN | 420 | 23.0 | H | 81 | 8.0 |
| —C≡ | 100 | 6.5 | —CN(Arom) | 252 | 27.0 | —C$_5$H$_5$(Arom) | 731 | 72.0 |
| —O— | 120 | 5.1 | —CN(Poly) | 420 | 27.0 | —C$_5$H$_4$(Arom) | 655 | 62.0 |
| —O— (Arom, Lin) | 70 | 3.8 | —NO$_2$ | 481 | 24.0 | —C$_5$H$_3$(Arom) | 550 | 39.0 |
| —O— (Epoxy) | 176 | 5.1 | —NO$_2$(Arom) | 342 | 32.0 | —C$_5$H$_2$(Arom) | 450 | 27.0 |
| —CO— | 286 | 10.0 | —NCO | 498 | 35.0 | —C$_5$H$_5$(Poly) | 731 | 79.0 |
| —COOH | 373 | 24.4 | —NHCO— | 690 | 18.5 | —C$_5$H$_4$(Poly) | 655 | 69.0 |
| —COOH(Arom) | 242 | 24.4 | >NHCO— | 441 | 5.4 | —C$_5$H$_3$(Poly) | 550 | 47.0 |
| —COO— | 353 | 19.6 | —CL(Mono) | 330 | 23.0 | —C$_5$H$_2$(Poly) | 450 | 32.0 |
| —COO— (Poly) | 330 | 22.0 | —CL(Di) | 250 | 25.0 | -(Cyclohexyl) | 790 | 97.5 |

TABLE 1-continued

| Groups | Okitsu's ΔF | Δv | Groups | Okitsu's ΔF | Δv | Groups | Okitsu's ΔF | Δv |
|---|---|---|---|---|---|---|---|---|
| —O—CO—O— | 526 | 20.0 | —CL(Tri, Tetra) | 235 | 27.0 | (Plus onto upper groups) | | |
| —CHO | 370 | 25.0 | —CL(Arom) | 235 | 27.0 | 3 Member 1 in | +110 | +18 |
| —CHO(Arom) | 213 | 29.0 | —CL(>C<) | 235 | 28.0 | 4 Member 1 in | +110 | +18 |
| —OH(Mono) | 395 | 10.0 | —CL(Poly) | 270 | 27.0 | 5 Member 1 in | +110 | +16 |
| —OH(Ether) | 342 | 12.0 | —Br(mean) | 302 | 30.0 | 6 Member 1 in | +100 | +16 |
| —OH(H$_2$O) | 342 | 12.0 | —F(mean) | 130 | 19.0 | Conjugated Double bond | +30 | −22 |
| —OH(Poly) | 282 | 17.0 | —F(Poly) | 110 | 21.0 | Conjugated Double bond(Link) | +30 | −10 |

Note:
(Poly) = Polymer; (Arom) = Aromatic; (Lin) = Link

For example, the SP value for heptane as a solvent is determined as follows.

Heptane has the following atomic groups: two —CH$_3$ groups and five —CH$_2$— groups. The ΔF and Δv values for the respective atomic groups are obtained from Table 1.

$$\Sigma\Delta F = 205 \times 2 + 132 \times 5 = 1,070$$

$$\Sigma\Delta v = 31.8 \times 2 + 16.5 \times 5 = 146.1$$

Therefore, from above formula (3), $\delta_{hep}$ for heptane can be determined as follows.

$$\delta_{hep} = \Sigma\Delta F/\Sigma\Delta v = 1,070/146.1 = 7.32$$

For example, the SP value for a mixed solution of 50% by weight heptane and 50% by weight toluene can be determined as follows. As noted above, the SP value for heptane is 7.32. The SP value for toluene alone, determined by the same method, is 9.02. Because the molecular weight of heptane is 100 and the molecular weight of toluene is 92, the molar fraction of the mixed solvent is heptane:toluene=50/100:50/92=0.48:0.52. Therefore, $\phi_{hep}$=0.48, and $\phi_{tol}$=0.52. From above formula (4), the SP value $\delta_{mix}$ of the mixed solvent can be determined as follows.

$$\begin{aligned}\delta_{mix} &= \phi_{hep} \times \delta_{hep} + \phi_{tol} \times \delta_{tol} \\ &= 0.48 \times 7.32 + 0.52 \times 9.02 \\ &= 8.20\end{aligned}$$

For example, the SP value for polystyrene as the polymer is determined as follows.

Polystyrene has the following atomic groups: one —CH$_2$—, one >CH— (Poly), and one —C$_6$H$_5$ (Poly). The ΔF and Δv values for the respective atomic groups are obtained from Table 1.

$$\Sigma\Delta F = 132 \times 1 + 28.6 \times 1 + 731 \times 1 = 891.6$$

$$\Sigma\Delta v = 16.5 \times 1 + 1.9 \times 1 + 79.0 \times 1 = 97.4$$

Therefore, from above formula (3), the $\delta_{PSt}$ for polystyrene can be determined as follows.

$$\delta_{PSt} = 891.6/97.4 = 9.15$$

For example, the SP value for a copolymer of 30% by weight polystyrene and 70% by weight polymethyl methacrylate can be determined as follows. As noted above, the SP value for polystyrene alone is 9.15. The SP value for polymethyl methacrylate alone, determined by the same method, is 9.54. Because the molecular weight of styrene is 104 and the molecular weight of methyl methacrylate is 100, the molar fraction of the copolymer is polystyrene:polymethyl methacrylate=30/104:70/100=0.29:0.71. From above formula (4), the SP value $\delta_{mix}$ of the copolymer can be determined as follows.

$$\begin{aligned}\delta_{mix} &= \phi_{PSt} \times \delta_{PSt} + \phi_{PMMA} \times \delta_{PMMA} \\ &= 0.29 \times 9.15 + 0.71 \times 9.54 \\ &= 9.43\end{aligned}$$

Illustrative, non-limiting, examples of the radical polymerizable monomer include compounds having a vinyl group, such as vinyl compounds, vinylidene compounds and vinylene compounds. Illustrative examples of compounds having a vinyl group include conjugated monomers such as styrene, methyl methacrylate, methyl acrylate and acrylonitrile; and non-conjugated monomers such as vinyl acetate and vinyl chloride.

These radical polymerizable monomers may be used alone or as combinations of two or more thereof.

In cases where the above radical polymerizable monomer is selected in such a way that the polymer obtained by polymerization is thermoplastic and has gas barrier properties, by including as the above oil-soluble solvent a volatile oil-soluble solvent such as the subsequently described aliphatic hydrocarbons, thermally expandable single-hole hollow polymer particles can be produced. Such thermally expandable single-hole hollow polymer particles, when heated to at least the softening point of the shell so as to volatilize the oil-soluble solvent, thermally expand, becoming particles having an even higher degree of hollowness.

In order to form a polymer that is thermoplastic and has gas barrier properties, the above radical polymerizable monomer preferably includes, for example, a nitrile monomer such as acrylonitrile or methacrylonitrile, or vinylidene chloride. In cases where a nitrile monomer is used to form a polymer that is thermoplastic and has gas barrier properties, it is preferable for the amount of nitrile monomer as a proportion of the above radical polymerizable monomer overall to be at least 30% by weight.

The SP value of the polymer obtained by polymerization (SPp) can be calculated as described above from the types and relative proportions of the radical polymerizable monomers used.

The above oil-soluble solvent plays the role of a hole-forming agent in the method for producing single-hole hollow polymer particles of the invention. The oil-soluble solvent is not subject to any particular limitation, provided it is an oil-soluble solvent having an SP value (SPs) which satisfies above formula (1).

In the specification, "oil-soluble solvent" refers to a solvent having a log Pow (octanol/water partition coefficient) of 0 or more. The log Pow of the solvent is determined as described below.

A mixture obtained by thoroughly mixing together n-octanol and water is left to stand for 24 hours, after which solvent is added to the mixture and additional mixing is carried out. Next, the solvent concentration (Co) in the octanol phase and the solvent concentration (Cw) in the aqueous phase are measured by gas chromatography. Using the Co and Cw obtained, the log Pow is computed from formula (5) below.

$$\log Pow = \log(Co/Cw) \tag{5}$$

Co: solvent concentration in octanol phase
Cw: solvent concentration in aqueous phase Illustrative examples of the oil-soluble solvent include aromatic hydrocarbons such as toluene and xylene; aliphatic hydrocarbons or cyclic hydrocarbons such as propane, cyclopropane, butane, cyclobutane, isobutane, n-pentane, cyclopentane, neopentane, isopentane, n-hexane, cyclohexane, 2-methylpentane, 2,2-dimethylbutane, n-heptane, cycloheptane, n-octane, cyclooctane and isooctane; ketones such as methyl isobutyl ketone; and esters such as ethyl acetate. In cases where these oil-soluble solvents are used, after forming single-hole hollow polymer particle shells as subsequently described, single-hole hollow polymer particles having a cavity may be produced by volatilizing the oil-soluble solvent, or single-hole hollow polymer particles which contain the above oil-soluble solvent may be produced without volatilizing the oil-soluble solvent.

By selecting the above radical polymerizable monomer in the manner described above, thermally expandable single-hole hollow polymer particles can be produced using these oil-soluble solvents. In cases where thermally expandable single-hole hollow polymer particles are produced, of the above-mentioned aliphatic hydrocarbons and cyclic hydrocarbons, it is preferable for the oil-soluble solvent used to be a volatile oil-soluble solvent having a vaporization temperature which is no higher than the shell softening temperature.

These oil-soluble solvents may be used singly or as combinations of two or more thereof.

The amount of oil-soluble solvent included may be suitably adjusted according to the outside diameter and inside diameter of the target single-hole hollow polymer particles, although the preferred lower limit is 10 parts by weight per 100 parts by weight of the radical polymerizable monomer, and the preferred upper limit is 1,000 parts by weight. At an amount of the above oil-soluble solvent below 10 parts by weight, there may be substantially no inner hole formation. At an oil-soluble solvent content of greater than 1,000 parts by weight, the strength of the resulting single-hole hollow polymer particles may dramatically decrease. The amount of the above oil-soluble solvent has a more preferred lower limit of 20 parts by weight, and a more preferred upper limit of 600 parts by weight.

The oil-soluble polymerization initiator, although not subject to any particular limitation, is exemplified by oil-soluble polymerization initiators for initiating radical polymerization.

In the specification, "oil-soluble polymerization initiator" refers to a polymerization initiator having a log Pow (octanol/water partition coefficient) of 0 or more. The log Pow of the polymerization initiator is determined as described below.

A mixture obtained by thoroughly mixing together n-octanol and water is left to stand for 24 hours, after which polymerization initiator is added to the mixture and additional mixing is carried out. Next, the polymerization initiator concentration (Co) in the octanol phase and the polymerization initiator concentration (Cw) in the aqueous phase are measured by gas chromatography and, using the Co and Cw obtained, the log Pow is computed from formula (6) below.

$$\log Pow = \log(Co/Cw) \tag{6}$$

Co: polymerization initiator concentration in octanol phase
Cw: polymerization initiator concentration in aqueous phase Illustrative examples of the oil-soluble polymerization initiator include peroxides such as benzoyl peroxide, diisopropyl peroxycarbonate, dioctyl peroxydicarbonate, t-butyl peroxylaurate, lauroyl peroxide and dioctanoyl peroxide; and azo compounds such as azobisisobutyronitrile, azobis(2,4-dimethylvaleronitrile), 1,1-azobis(cyclohexane-1-carbonitrile) and dimethyl-2,2-azobis(2-methylpropionate). These oil-soluble polymerization initiators may be used singly or as combinations of two or more thereof.

The amount of the oil-soluble polymerization initiator included is not subject to any particular limitation, although the preferred lower limit per 100 parts by weight of the radical polymerizable monomer is 0.01 parts by weight, and the preferred upper limit is 20 parts by weight. At an amount of the oil-soluble polymerization initiator below 0.01 parts by weight, single-hole hollow polymer particles may not form. Inclusion of the oil-soluble polymerization initiator in an amount greater than 20 parts by weight substantially does not contribute to the reaction and may cause undesirable effects such as bleed-out. The lower limit in the amount of oil-soluble polymerization initiator included is more preferably 0.1 parts by weight, and the upper limit is more preferably 10 parts by weight.

When mixing together the above seed particle dispersion, radical polymerizable monomer, oil-soluble solvent and oil-soluble polymerization initiator, it is possible to add the radical polymerizable monomer, oil-soluble solvent and oil-soluble polymerization initiator directly to the seed particle dispersion and carry out mixing, although a method in which these are first added to a water-containing dispersion medium so as to prepare an emulsion, following which the emulsion is added to the above seed particle dispersion and mixed therewith is preferred. By addition following preparation as an emulsion, the radical polymerizable monomer can be more uniformly absorbed in the seed particles.

The radical polymerizable monomer, oil-soluble solvent and oil-soluble polymerization initiator may be added to the seed particle dispersion and mixed therewith following preparation of a mixture of these ingredients into a single emulsion, or may be added to and mixed with the seed particle dispersion as separately prepared emulsions of the respective ingredients. In cases where emulsions of each of the above radical polymerizable monomer, oil-soluble solvent and oil-soluble polymerization initiator are separately prepared, the order in which the respective emulsions and the seed particle dispersion are mixed is not subject to any particular limitation.

In the method for producing single-hole hollow polymer particles of the invention, the seed particle dispersion may be added to and mixed with an emulsion obtained by dispersing the radical polymerizable monomer, oil-soluble solvent and oil-soluble polymerization initiator.

The dispersant in the emulsion of the radical polymerizable monomer, etc. is not subject to any particular limitation, and may be the same dispersant as that used in the seed particle dispersion, or may be a different dispersant.

The dispersant in the emulsion of the radical polymerizable monomer, etc. preferably includes an emulsifying agent. Illustrative, non-limiting, examples of the emulsifying agent include alkyl sulfates/sulfonates, alkylbenzene sulfonates, triethanolamine alkyl sulfates, polyoxyethylene alkyl ethers and polyvinyl alcohols.

When the emulsion of the radical polymerizable monomer, etc. is added to the seed particle dispersion, the entire amount of the emulsion may be added at once, or the emulsion may be added in divided portions. When added in divided portions, dropwise addition is acceptable.

No particular imitation is imposed on the amount of oily ingredients (radical polymerizable monomer, oil-soluble solvent and oil-soluble polymerization initiator) added to the seed particles, although the preferred lower limit per 100 parts by weight of the seed particles is 15 parts by weight, and the preferred upper limit is 100,000 parts by weight. At an amount of addition of the radical polymerizable monomer, etc. of less than 15 parts by weight, there is room for only a very small amount of radical polymerizable monomer, etc. to be absorbed, as a result of which it may not be possible to obtain single-hole hollow polymer particles having a high degree of hollowness. At an amount of addition of the radical polymerizable monomer, etc. of greater than 100,000, oily ingredients which cannot be entirely absorbed in the seed particles arise, which may cause solid particles and the like to be present as well. The lower limit in the amount of oily ingredients added is more preferably 230 parts by weight, and the upper limit is more preferably 50,000 parts by weight.

When the seed particle dispersion, the radical polymerizable monomer, the oil-soluble solvent and the oil-soluble polymerization initiator are mixed together, the radical polymerizable monomer, the oil-soluble solvent and the oil-soluble polymerization initiator are absorbed in the seed particles, resulting in the formation of uniform swollen particle droplets.

In the method for producing single-hole hollow polymer particles of the invention, the step of polymerizing the radical polymerizable monomer in the resulting swollen particle droplets is carried out. By polymerizing the radical polymerizable monomer, a dispersion of core-shell particles is obtained in which the core is formed of the oil-soluble solvent and the shell is formed of the polymer obtained by polymerizing the radical polymerizable monomer.

Polymerization may be initiated by exposure to light or by heating, depending on the type of oil-soluble polymerization initiator.

In the method for producing single-hole hollow polymer particles of the invention, the resulting core-shell particles are repeatedly rinsed with pure water, and single-hole hollow polymer particles having a cavity may be produced by volatilizing the oil-soluble solvent, or single-hole hollow polymer particles containing the oil-soluble solvent may be produced by not volatilizing the oil-soluble solvent.

With the method for producing single-hole hollow polymer particles of the invention, single-hole hollow polymer particles having an outside diameter and an inside diameter which are both very uniform can be produced. Because the outside diameter and the inside diameter are sufficiently uniform, there is no need for a special classifying operation involving the use of, for example, a sieve, air classification or specific gravity difference classification. Because the yield is high and the steps are short, single-hole hollow polymer particles can be inexpensively and rapidly supplied.

The single-hole hollow polymer particles produced using the method for producing single-hole hollow polymer particles of the invention are an additional aspect of the invention.

The single-hole hollow polymer particles of the invention may have a cavity, or may contain the above-mentioned oil-soluble solvent.

When the single-hole hollow polymer particles of the invention have a cavity, because the outside diameter and, the inside diameter are extremely uniform, the addition of a very small amount of the particles enables increases in specific surface area to be achieved and makes it possible to control light-diffusing properties, lightweight properties, thermal insulating properties, cushionability, and the selective absorption, reflection and transmission of ultraviolet light, visible light or infrared light.

In cases where the single-hole hollow polymer particles of the invention have a shell which is thermoplastic and has gas barrier properties and contain, as the above oil-soluble solvent, a volatile oil-soluble solvent such as the above-described aliphatic hydrocarbons, the particles can be used as thermally expandable single-hole hollow polymer particles. Such thermally expandable single-hole hollow polymer particles, when heated to at least the softening point of the shell so as to volatilize the oil-soluble solvent, thermally expand, becoming particles having a higher degree of hollowness. Because the single-hole hollow polymer particles of the invention have extremely uniform outside and inside diameters, the particles following thermal expansion also have an outside diameter and an inside diameter which are extremely uniform. As a result, when the particles are employed in various applications intended to confer light diffusing properties, lightweight properties, thermal insulating properties, cushionability, and the selective absorption, reflection and transmission of ultraviolet light, visible light or infrared light, these performance attributes are easy to control.

The average outside diameter (average particle size) of the single-hole hollow polymer particles of the invention is not subject to any particular limitation, although the preferred lower limit is 0.1 µm and the preferred upper limit is 100 µm. At an average outside diameter below 0.1 µm, single holes of a sufficient size may not be obtained, or the amount of oil-soluble solvent contained may become small. At an average outside diameter in excess of 100 µm, the absorption of oil-soluble solvent in the seed particles slows, which may lower productivity. The lower limit in the average outside diameter of the single-hole hollow polymer particles of the invention is more preferably 0.5 µm, and the upper limit is more preferably 20 µm.

The outside diameter (particle size) Cv of the single-hole hollow polymer particles of the invention has a preferred upper limit of 10%. At an outside diameter Cv in excess of 10%, in cases where the single-hole hollow polymer particles of the invention are thermally expandable, the uniformity of the outside diameter of the particles following thermal expansion may decrease. The upper limit of the outside diameter Cv is more preferably 7%.

The outside diameter Cv of the single-hole hollow polymer particle of the invention can be calculated in the same way as the particle size Cv of the seed particles.

The average inside diameter of the single-hole hollow polymer particles of the invention is not subject to any particular limitation, although the preferred lower limit is 5% of the average outside diameter and the preferred upper limit is 99.9% of the average outside diameter. At an average inside diameter below 5% of the average outside diameter, single holes of a sufficient size may not be obtained or the amount of oil-soluble solvent contained may become small. At an average inside diameter greater than 99.9% of the average outside diameter, the shell becomes thin, as a result of which the oil-soluble solvent contained may leak out. The lower limit in the average inside diameter of the single-hole hollow polymer particles of the invention is more preferably 10% of the average outside diameter, and the upper limit is more preferably 99% of the average outside diameter.

The inside diameter Cv of the single-hole hollow polymer particles of the invention has a preferred upper limit of 10%. At an inside diameter Cv in excess of 10%, in cases where the single-hole hollow polymer particles of the invention are thermally expandable, the uniformity of the inside diameter of the particles following thermal expansion may decrease. The upper limit of the inside diameter Cv is more preferably 7%.

The inside diameter Cv of the single-hole hollow polymer particles of the invention can be calculated in the same way as the particle size Cv of the seed particles.

Effects of the Invention

The invention is thus able to provide a method for producing single-hole hollow polymer particles which have an extremely uniform outside diameter and inside diameter, and thus do not require a classifying operation. In addition, the invention is also able to provide single-hole hollow polymer particles produced by such a method for producing single-hole hollow polymer particles.

MODE FOR CARRYING OUT THE INVENTION

The embodiments of the invention are described below in greater detail by way of examples, although the invention is not limited by these examples.

Example 1

One hundred parts by weight of styrene, 3 parts by weight of potassium persulfate, 25 parts by weight of n-octylmercaptan and 2,500 parts by weight of water were mixed and reacted at 70° C. for 24 hours under stirring, thereby preparing a seed particle dispersion of spherical uncrosslinked polystyrene particles having a volume-average particle size of 0.5 μm and a Cv of 15% dispersed in water to a concentration of 1.5% by weight.

Fifty parts by weight of acrylonitrile and 50 parts by weight of trimethylolpropane trimethacrylate as the radical polymerizable monomer (the SP value of the polymer obtained by polymerizing this radical polymerizable monomer is 12.46), 100 parts by weight of heptane (SP value, 7.32) as the oil-soluble solvent, and 4 parts by weight of benzoyl peroxide as the oil-soluble polymerization initiator were uniformly dissolved to obtain a mixture. An emulsion was prepared by the addition and admixture of 2 parts by weight of triethanolamine laurylsulfate as the emulsifying agent and water to the mixture.

The emulsion was added to the resulting seed particle dispersion in an amount such that the weight of the oily ingredients was 200 times the weight of the polystyrene particles, and stirring was carried out for 24 hours, thereby giving a dispersion of swollen particle droplets obtained from seed particles that had absorbed the radical polymerizable monomer, the oil-soluble solvent and the oil-soluble polymerization initiator. The constituents of the oily ingredients were the radical polymerizable monomer, the oil-soluble solvent and the oil-soluble polymerization initiator.

By carrying out the reaction at 85° C. for 10 hours while stirring the resulting dispersion of swollen particle droplets, a dispersion of core-shell particles was obtained in which the core was formed of heptane and the shell was formed of a polyacrylonitrile/trimethylolpropane trimethacrylate copolymer.

The resulting core-shell particles were repeatedly rinsed with pure water, then vacuum dried to volatilize the heptane, thereby giving polymer particles.

Example 2

Aside from using 70 parts by weight of methyl methacrylate and 30 parts by weight of trimethylolpropane trimethacrylate as the radical polymerizable monomer (the SP value of the polymer obtained by polymerizing this radical polymerizable monomer is 9.64) and using 100 parts by weight of isooctane (SP value, 7.30) as the oil-soluble solvent, polymer particles were obtained in the same way as in Example 1.

Example 3

Aside from using 25 parts by weight of acrylonitrile, 50 parts by weight of trimethylolpropane trimethacrylate and 25 parts by weight of ethylene glycol dimethacrylate as the radical polymerizable monomer (the SP value of the polymer obtained by polymerizing this radical polymerizable monomer is 11.95) and using 100 parts by weight of neopentane (SP value, 5.20) as the oil-soluble solvent, polymer particles were obtained in the same way as in Example 1.

Example 4

Aside from using 35 parts by weight of acrylonitrile and 65 parts by weight of divinylbenzene as the radical polymerizable monomer (the SP value of the polymer obtained by polymerizing this radical polymerizable monomer is 11.25) and using 100 parts by weight of toluene (SP value, 9.02) as the oil-soluble solvent, polymer particles were obtained in the same way as in Example 1.

Example 5

Aside from setting the amount of potassium persulfate included at 5 parts by weight, a seed particle dispersion of spherical uncrosslinked polystyrene particles having a volume-average particle size of 0.2 μm and a Cv of 15% and dispersed in water to a concentration of 1.5% by weight was prepared in the same way as in Example 1.

Using the resulting seed particle dispersion, aside from adding the emulsion in an amount such that the weight of oily ingredients was 20 times the weight of the polystyrene particles, polymer particles were obtained in the same way as in Example 1.

Example 6

Aside from setting the amount of potassium persulfate included at 0.5 parts by weight, a seed particle dispersion of spherical uncrosslinked polystyrene particles having a volume-average particle size of 2.0 μm and a Cv of 15% and dispersed in water to a concentration of 1.5% by weight was prepared in the same way as in Example 1.

Using the resulting seed particle dispersion, aside from adding the emulsion in an amount such that the weight of oily ingredients was 125 times the weight of the polystyrene particles, polymer particles were obtained in the same way as in Example 1.

Example 7

Aside from including 0.5 parts by weight of potassium persulfate and 0.1 parts by weight of sodium chloride instead of 3 parts by weight of potassium persulfate, a seed particle dispersion of spherical uncrosslinked polystyrene particles having a volume-average particle size of 5.0 μm and a Cv of 15% and dispersed in water to a concentration of 1.5% by weight was prepared in the same way as in Example 1.

Using the resulting seed particle dispersion, aside from adding the emulsion in an amount such that the weight of oily ingredients was 125 times the weight of the polystyrene particles, polymer particles were obtained in the same way as in Example 1.

Comparative Example 1

Aside from not using an oil-soluble solvent, polymer particles were obtained in the same way as in Example 1.

Comparative Example 2

Aside from using 33 parts by weight of styrene and 67 parts by weight of divinylbenzene as the radical polymerizable monomer (the SP value of the polymer obtained by polymerizing this radical polymerizable monomer is 9.20) and using 100 parts by weight of toluene (SP value, 9.02) as the oil-soluble solvent, polymer particles were obtained in the same way as in Example 1.

Comparative Example 3

Aside from using 30 parts by weight of acrylonitrile and 70 parts by weight of divinylbenzene as the radical polymerizable monomer (the SP value of the polymer obtained by polymerizing this radical polymerizable monomer is 11.05) and using 100 parts by weight of toluene (SP value, 9.02) as the oil-soluble solvent, polymer particles were obtained in the same way as in Example 1.

Comparative Example 4

Aside from using 100 parts by weight of acrylonitrile as the radical polymerizable monomer (the SP value of the polymer obtained by polymerizing this radical polymerizable monomer is 12.79) and using 100 parts by weight of neopentane (SP value, 5.20) as the oil-soluble solvent, polymer particles were obtained in the same way as in Example 1.

Comparative Example 5

Aside from using 4 parts by weight of potassium persulfate instead of 4 parts by weight of benzoyl peroxide as the polymerization initiator, polymer particles were obtained in the same way as in Example 1.

Comparative Example 6

An emulsion was prepared by uniformly dissolving 50 parts by weight of acrylonitrile and 50 parts by weight of trimethylolpropane trimethacrylate as the radical polymerizable monomer, 100 parts by weight of heptane as the oil-soluble solvent and 4 parts by weight of benzoyl peroxide as the oil-soluble polymerization initiator, and passing the resulting solution through a porous membrane so as to disperse the solution in a continuous layer containing an emulsifying agent and water.

The resulting emulsion was reacted at 85° C. for 10 hours under stirring, thereby giving a dispersion of core-shell particles in which the core was formed of heptane and the shell was formed of a polyacrylonitrile/trimethylolpropane trimethacrylate copolymer.

The resulting core-shell particles were repeatedly rinsed with pure water, then vacuum dried to volatilize the heptane, giving polymer particles.

Evaluations

The polymer particles obtained in Examples 1 to 7 and Comparative Examples 1 to 6 were evaluated by the following methods. The results are shown in Table 2.

(1) Measurement of Outside Diameter

The resulting polymer particles were examined with a scanning electron microscope at a magnification that allows about 100 particles to be observed in a single field of view, the maximum diameters of 50 randomly selected particles were measured with a vernier caliper, and the numerical average and coefficient of variation of the maximum diameters were determined. These values were treated as the average outside diameter and the outside diameter Cv.

(2) Measurement of Inside Diameter and Evaluation of Single-Hole Property

The resulting polymer particles were embedded in epoxy resin, following which the resin was cured and cross-sectional slices were cut with a microtome. The slices were examined with a scanning electron microscope at a magnification that allows about 100 particle cross-sections to be observed in a single field of view.

To evaluate the single-hole property, the cross-sections of 50 randomly selected particles were evaluated. Cases in which the number of particles having a single hole was at least 49 were rated as "excellent (⊚)"; cases in which the number of such particles was 45 to 48 were rated as "good (○)"; cases in which the number of such particles was 40 to 44 were rated as "fair (Δ)"; and cases in which the number of such particles was 39 or less were rated as "poor (x)."

In addition, for the cross-sections of the randomly selected 50 particles, the maximum diameters of the single holes were measured with a vernier caliper, and the numerical average and coefficient of variation of the single-hole maximum diameters were determined. These values were treated as the average inside diameter and the inside diameter Cv. The average inside diameter and inside diameter Cv were computed for those particles having a single-hole property rating of "excellent (⊚)" or "good (○)" and in which a single hole was present.

TABLE 2

| | Use of seed particles | SP value of polymer obtained by polymerizing radical polymerizable monomer (SPp) | SP value of oil-soluble solvent (SPs) | SPp − SPs | Polymerization initiator | Average outside diameter (μm) | Outside diameter Cv (%) | Single-hole property | Average inside diameter (μm) | Inside diameter Cv (%) |
|---|---|---|---|---|---|---|---|---|---|---|
| Example 1 | Yes | 12.46 | 7.32 | 5.14 | Oil-soluble | 3.0 | 4 | ◎ | 1.8 | 5 |
| Example 2 | Yes | 9.64 | 7.30 | 2.34 | Oil-soluble | 3.0 | 5 | ○ | 1.5 | 6 |
| Example 3 | Yes | 11.95 | 5.20 | 6.75 | Oil-soluble | 3.0 | 4 | ◎ | 1.8 | 4 |
| Example 4 | Yes | 11.25 | 9.02 | 2.23 | Oil-soluble | 3.0 | 5 | ○ | 1.6 | 5 |
| Example 5 | Yes | 12.46 | 7.32 | 5.14 | Oil-soluble | 0.5 | 7 | ◎ | 0.2 | 8 |
| Example 6 | Yes | 12.46 | 7.32 | 5.14 | Oil-soluble | 10.0 | 3 | ◎ | 6.0 | 4 |
| Example 7 | Yes | 12.46 | 7.32 | 5.14 | Oil-soluble | 25.0 | 3 | ◎ | 15.0 | 5 |
| Comparative Example 1 | Yes | 12.46 | — | — | Oil-soluble | 3.0 | 4 | X | — | — |
| Comparative Example 2 | Yes | 9.20 | 9.02 | 0.18 | Oil-soluble | 3.0 | 4 | X | — | — |
| Comparative Example 3 | Yes | 11.05 | 9.02 | 2.03 | Oil-soluble | 3.0 | 5 | Δ | — | — |
| Comparative Example 4 | Yes | 12.79 | 5.20 | 7.59 | Oil-soluble | 1.3 | 15 | X | — | — |
| Comparative Example 5 | Yes | 12.46 | 7.32 | 5.14 | Hydrophilic | 3.0 | 45 | X | — | — |
| Comparative Example 6 | No | 12.46 | 7.32 | 5.14 | Oil-soluble | 3.0 | 25 | ○ | 1.5 | 35 |

Example 8

One hundred parts by weight of styrene, 3 parts by weight of potassium persulfate, 25 parts by weight of n-octylmercaptan and 2,500 parts by weight of water were mixed and reacted at 70° C. for 24 hours under stirring, thereby preparing a seed particle dispersion of spherical uncrosslinked polystyrene particles having a volume-average particle size of 0.5 μm and a Cv of 15% dispersed in water to a concentration of 1.5% by weight.

Sixty parts by weight of acrylonitrile, 40 parts by weight of methacrylonitrile and 0.5 parts by weight of trimethylolpropane trimethacrylate as the radical polymerizable monomer (the SP value of the polymer obtained by polymerizing this radical polymerizable monomer is 12.53), 25 parts by weight of isopentane (SP value, 6.99) as the oil-soluble solvent, and 1 part by weight of benzoyl peroxide as the oil-soluble polymerization initiator were uniformly dissolved to obtain a mixture. An emulsion was prepared by the addition and admixture of 2 parts by weight of triethanolamine laurylsulfate as the emulsifying agent and water to the mixture.

The emulsion was added to the resulting seed particle dispersion in an amount such that the weight of the oily ingredients was 200 times the weight of the polystyrene particles, and stirring was carried out for 24 hours, thereby giving a dispersion of swollen particle droplets obtained from seed particles that had absorbed the radical polymerizable monomer, the oil-soluble solvent and the oil-soluble polymerization initiator. The constituents of the oily ingredients were the radical polymerizable monomer, the oil-soluble solvent and the oil-soluble polymerization initiator.

By carrying out the reaction at 85° C. for 10 hours while stirring the resulting dispersion of swollen particle droplets, a dispersion of core-shell particles was obtained in which the core was formed of isopentane and the shell was formed of a polyacrylonitrile/polymethacrylonitrile/trimethylolpropane trimethacrylate copolymer.

The resulting core-shell particles were repeatedly rinsed with pure water, then vacuum dried, thereby giving polymer particles.

Example 9

Aside from using 50 parts by weight of acrylonitrile, 50 parts by weight of methyl methacrylate and 0.5 parts by weight of trimethylolpropane trimethacrylate as the radical polymerizable monomer (the SP value of the polymer obtained by polymerizing this radical polymerizable monomer is 11.66) and using 25 parts by weight of isopentane (SP value, 6.99) as the oil-soluble solvent, polymer particles were obtained in the same way as in Example 8.

Example 10

Aside from setting the amount of potassium persulfate included at 0.5 parts by weight, a seed particle dispersion of spherical uncrosslinked polystyrene particles having a volume-average particle size of 2.0 μm and a Cv of 15% and dispersed in water to a concentration of 1.5% by weight was prepared in the same way as in Example 8.

Using the resulting seed particle dispersion, aside from adding the emulsion in an amount such that the weight of oily ingredients was 125 times the weight of the polystyrene particles, polymer particles were obtained in the same way as in Example 8.

Example 11

Aside from including 0.5 parts by weight of potassium persulfate and 0.1 parts by weight of sodium chloride instead of 3 parts by weight of potassium persulfate, a seed particle dispersion of spherical uncrosslinked polystyrene particles having a volume-average particle size of 5.0 μm and a Cv of 15%, and dispersed in water to a concentration of 1.5% by weight, was prepared in the same way as in Example 8.

Using the resulting seed particle dispersion, aside from adding the emulsion in an amount such that the weight of oily ingredients was 125 times the weight of the polystyrene particles, polymer particles were obtained in the same way as in Example 8.

Comparative Example 7

Aside from not using an oil-soluble solvent, polymer particles were obtained in the same way as in Example 8.

Comparative Example 8

Aside from using 1 part by weight of potassium persulfate instead of 1 part by weight of benzoyl peroxide as the polymerization initiator, polymer particles were obtained in the same way as in Example 8.

Comparative Example 9

An emulsion was prepared by uniformly dissolving 60 parts by weight of acrylonitrile, 40 parts by weight of methacrylonitrile and 0.4 parts by weight of trimethylolpropane trimethacrylate as the radical polymerizable monomer, 100 parts by weight of isopentane as the oil-soluble solvent and 1 part by weight of benzoyl peroxide as the oil-soluble polymerization initiator, and passing the resulting solution through a porous membrane so as to disperse the solution in a continuous layer containing an emulsifying agent and water.

The resulting emulsion was reacted at 85° C. for 10 hours under stirring, thereby giving a dispersion of core-shell particles in which the core was formed of isopentane and the shell was formed of a polyacrylonitrile/polymethacrylonitrile/trimethylolpropane trimethacrylate copolymer.

The resulting core-shell particles were repeatedly rinsed with pure water, then vacuum dried, giving polymer particles.

Evaluations

The polymer particles obtained in Examples 8 to 11 and Comparative Examples 7 to 9 were evaluated by the following methods. The results are shown in Table 3.

(1) Measurement of Outside Diameter

The resulting polymer particles were examined with a scanning electron microscope at a magnification that allows about 100 particles to be observed in a single field of view, the maximum diameters of 50 randomly selected particles were measured with a vernier caliper, and the numerical average and coefficient of variation of the maximum diameters were determined. These values were treated as the average outside diameter and the outside diameter Cv.

(2) Measurement of Inside Diameter and Evaluation of Single-Hole Property

The resulting polymer particles were embedded in epoxy resin, following which the resin was cured and cross-sectional slices were cut with a microtome. The slices were examined with a scanning electron microscope at a magnification that allows about 100 particle cross-sections to be observed in a single field of view.

To evaluate the single-hole property, the cross-sections of 50 randomly selected particles were evaluated. Cases in which the number of particles having a single hole was at least 49 were rated as "excellent (⊚)"; cases in which the number of such particles was 45 to 48 were rated as "good (○)"; cases in which the number of such particles was 40 to 44 were rated as "fair (Δ)"; and cases in which the number of such particles was 39 or less were rated as "poor (x)."

In addition, for the cross-sections of the randomly selected 50 particles, the maximum diameters of the single holes were measured with a vernier caliper, and the numerical average and coefficient of variation of the single-hole maximum diameters were determined. These values were treated as the average inside diameter and the inside diameter Cv. The average inside diameter and inside diameter Cv were computed for those particles in which a single hole was present.

(3) Evaluation of Thermal Expandability (Foamability)

About 0.1 g of the resulting polymer particles was weighed out and placed in a 10 mL graduated cylinder. This was then set for 5 minutes in an oven heated to 150° C., following which the volume of the thermally expandable polymer particles which expanded in the graduated cylinder was measured. Cases in which the volume was 5 mL or more were rated as "excellent (⊚)"; cases in which the volume was at least 2 mL but less than 5 mL were rated as "good (○)"; cases in which the volume was at least 0.5 mL but less than 2 mL were rated as "fair (Δ)"; and cases in which the volume was less than 0.5 mL were rated as "poor (x)."

TABLE 3

| | Use of seed particles | SP value of polymer obtained by polymerizing radical polymerizable monomer (SPp) | SP value of oil-soluble solvent (SPs) | SPp − SPs | Polymerization initiator | Average outside diameter (μm) |
|---|---|---|---|---|---|---|
| Example 8 | Yes | 12.53 | 6.99 | 5.54 | Oil-soluble | 3.1 |
| Example 9 | Yes | 11.66 | 6.99 | 4.67 | Oil-soluble | 3.2 |
| Example 10 | Yes | 12.53 | 6.99 | 5.54 | Oil-soluble | 10.5 |
| Example 11 | Yes | 12.53 | 6.99 | 5.54 | Oil-soluble | 25.9 |
| Comparative Example 7 | Yes | 12.53 | — | — | Oil-soluble | 3.0 |
| Comparative Example 8 | Yes | 12.53 | 6.99 | 5.54 | Hydrophilic | 0.5 |
| Comparative Example 9 | No | 12.53 | 6.99 | 5.54 | Oil-soluble | 4.5 |

| | Outside diameter Cv (%) | Single-hole property | Average inside diameter (μm) | Inside diameter Cv (%) | Thermal expandability (foamability) |
|---|---|---|---|---|---|
| Example 8 | 4 | ⊚ | 1.8 | 5 | ○ |
| Example 9 | 5 | ○ | 1.5 | 6 | ○ |
| Example 10 | 3 | ⊚ | 6.0 | 4 | ⊚ |
| Example 11 | 3 | ⊚ | 15.0 | 5 | ⊚ |

TABLE 3-continued

| | | | | | |
|---|---|---|---|---|---|
| Comparative Example 7 | 4 | X | — | — | X |
| Comparative Example 8 | 45 | X | — | — | X |
| Comparative Example 9 | 25 | ○ | 2.2 | 42 | Δ |

INDUSTRIAL APPLICABILITY

The invention is able to provide a method for producing single-hole hollow polymer particles which have an extremely uniform outside diameter and inside diameter, and thus do not require a classifying operation. The invention is also able to provide single-hole hollow polymer particles produced by such a method for producing single-hole hollow polymer particles.

The invention claimed is:

1. A method for producing single-hole hollow polymer particles, which comprises:
preparing a dispersion of swollen particle droplets by mixing a seed particle dispersion obtained by dispersing uncrosslinked polymer-containing seed particles in a water-containing dispersion medium, with a radical polymerizable monomer, an oil-soluble solvent and an oil-soluble polymerization initiator, and causing the radical polymerizable monomer, the oil-soluble solvent and the oil-soluble polymerization initiator to be absorbed in the seed particles; and
polymerizing the radical polymerizable monomer in the swollen particle droplets,
wherein the relationship between the SP value of a polymer obtained by polymerizing the radical polymerizable monomer (SPp) and the SP value of the oil-soluble solvent (SPs) satisfies formula (1) below:

$$2.1 \leq SPp - SPs \leq 7.0 \qquad (1).$$

2. The method for producing single-hole hollow polymer particles according to claim 1,
wherein an emulsion obtained by dispersing the radical polymerizable monomer, the oil-soluble solvent and the oil-soluble polymerization initiator in a water-containing dispersion medium is mixed with the seed particle dispersion.

3. The method for producing single-hole hollow polymer particles according to claim 1,
wherein the seed particles have a particle size coefficient of variation (Cv) of 30% or less.

4. The method for producing single-hole hollow polymer particles according to claim 1,
wherein the radical polymerizable monomer contains a nitrile monomer.

5. Single-hole hollow polymer particles produced by the method for producing single-hole hollow polymer particles according to claim 1.

6. The single-hole hollow polymer particles according to claim 5,
which have an average outside diameter of from 0.1 to 100 μm and an outside diameter Cv of 10% or less.

7. The single-hole hollow polymer particles according to claim 5,
which have an inside diameter Cv of 10% or less.

8. The single-hole hollow powder particles according to claim 5,
which are thermally expandable.

* * * * *